United States Patent [19]

Mithuo et al.

[11] 4,121,552
[45] Oct. 24, 1978

[54] EXHAUST MEANS FOR TWO CYCLE ENGINES

[75] Inventors: Nagahama Mithuo, Hamamatsu; Aoi Kazuo, Iwata; Hirano Seiji, Hamamatsu, all of Japan

[73] Assignee: Yamaha Hatsudoki Kabushiki Kaisha, Iwata, Japan

[21] Appl. No.: 781,429

[22] Filed: Mar. 25, 1977

Related U.S. Application Data

[63] Continuation of Ser. No. 612,863, Sep. 12, 1975, abandoned.

[30] Foreign Application Priority Data

Sep. 17, 1974 [JP] Japan ............................ 49-111838[U]

[51] Int. Cl.² ............................................ F02B 75/02
[52] U.S. Cl. ............................ 123/65 PE; 123/65 A; 123/65 V
[58] Field of Search .............. 123/65 R, 65 A, 65 PE, 123/65 FM, 65 V, 65 P, 65 PP, 73 R, 73 SP; 60/314, 602, 603

[56] References Cited

U.S. PATENT DOCUMENTS

| 1,299,895 | 4/1919 | Anderson | 123/65 R |
| 1,477,994 | 12/1923 | Buchi | 60/314 |
| 1,612,143 | 12/1926 | Moss | 123/65 A |
| 1,745,824 | 2/1930 | Zoller | 123/65 V |
| 2,720,872 | 10/1955 | Yokoi | 123/65 V |
| 2,798,466 | 7/1957 | Rzepeuki | 123/65 V |
| 3,240,194 | 3/1966 | Rychlik | 123/65 A |
| 3,817,227 | 6/1974 | Onishi | 123/73 R |

FOREIGN PATENT DOCUMENTS

291,086  10/1928  United Kingdom ................. 123/65 R

Primary Examiner—Charles J. Myhre
Assistant Examiner—David D. Reynolds
Attorney, Agent, or Firm—Harold L. Stowell

[57] ABSTRACT

Two cycle internal combustion engines including a cylinder which is provided with one or more exhaust ports adapted to be closed by piston reciprocating in the cylinder. A valve member is provided in co-operation with the upper portion or upper one of the exhaust ports. Said valve member may be interconnected with the engine throttle valve in such a manner that it is closed under lower speed operation and opened under high speed operation of the engine so as to obtain optimum exhaust valve timing throughout the engine operating speed range.

2 Claims, 13 Drawing Figures

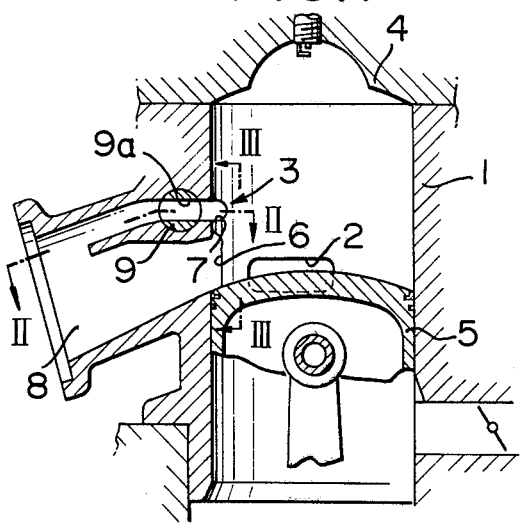
FIG.1
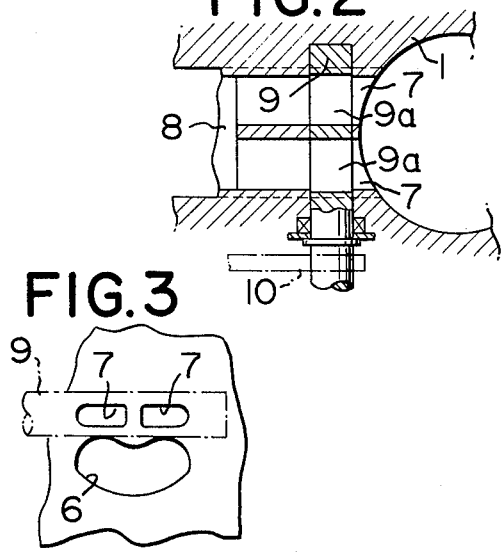
FIG.2
FIG.3
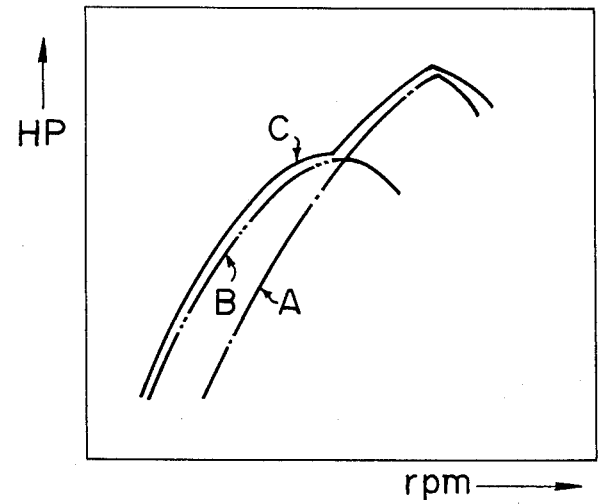
FIG.4
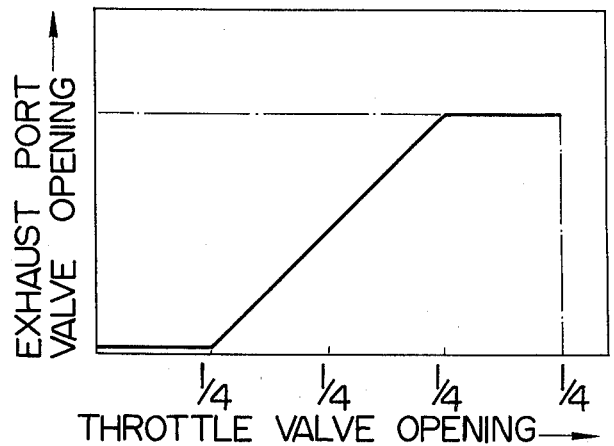
FIG.5

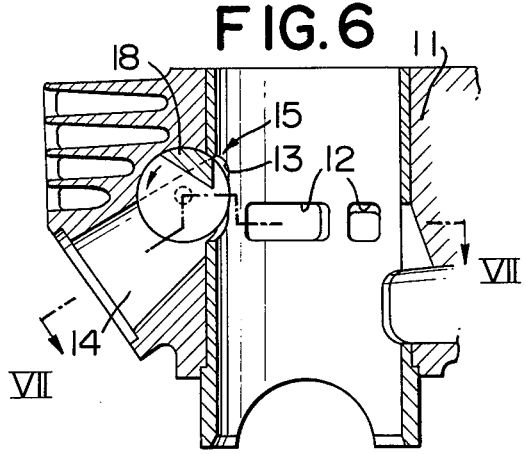
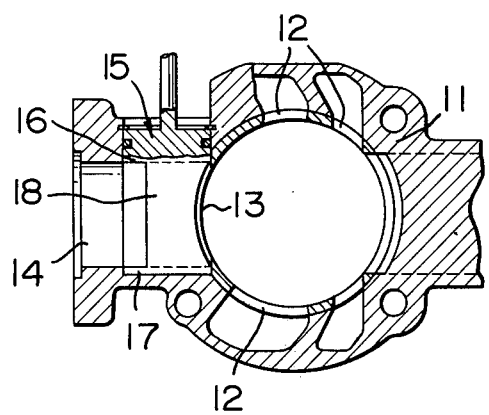
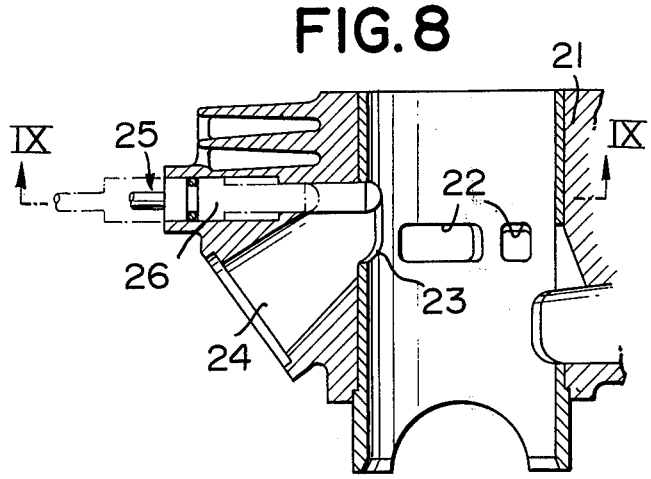
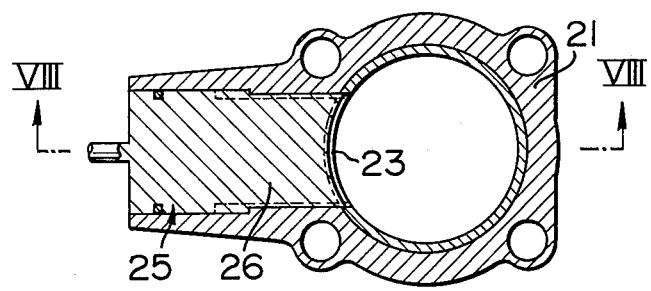

FIG. 11
FIG. 12
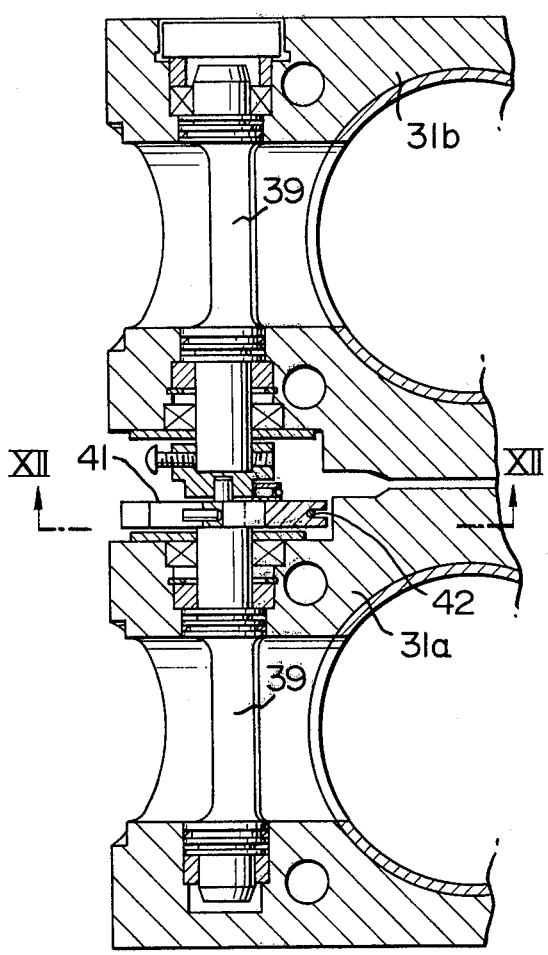
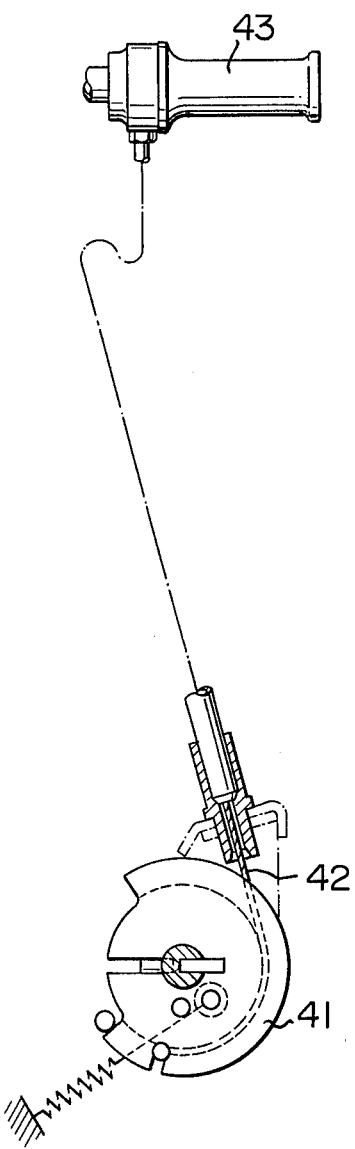

EXHAUST MEANS FOR TWO CYCLE ENGINES

This is a continuation of application Ser. No. 612,863, now abandoned, filed Sept. 12, 1975.

The present invention relates to two cycle internal combustion engines and more particularly to two cycle internal combustion engines having an engine cylinder formed with exhaust port means which is adapted to be controlled by a piston reciprocating in the cylinder.

In the aforementioned type of two cycle engines, the exhaust port means usually comprises an exhaust port which opens to the cylinder wall at a predetermined location so that it is closed and/or opened by the piston at a predetermined timing in each cycle of operation. It has been known in this type of engines that the location of the exhaust port has very important effects on the engine output and pollutant emissions from the engines. In order to improve high speed engine performance, the timings of the exhaust port must be so determined that comparatively long port opening period can be ensured. However, such exhaust port timings have adverse effects on low speed engine performance. With such exhaust port timings, there will be a substantial decrease in the amount of charge of combustible air-fuel mixture in low speed engine operation so that the engine output will be undesirably decreased. Further, in low speed engine operation, appreciable amount of unburnt mixture is allow to flow out of the cylinder through the exhaust port during scavenging and compression stroke of the engine operation resulting in an increase in pollutant emission in the exhaust gas. When the exhaust port timings are so determined that the problems in low speed engine operation can substantially be eliminated, it becomes no longer possible to ensure satisfactory engine performance in high speed operation. Thus, in the conventional two cycle engines of the aforementioned type, it has been impossible to attain satisfactory results throughout the engine operating speed range.

The present invention has therefore an object to provide two cycle internal combustion engines in which the aforementioned disadvantages are eliminated.

Another object of the present invention is to provide two cycle internal combustion engines which include means for adjusting exhaust port timings.

A further object of the present invention is to provide exhaust means for two cycle engines, said exhaust means having valve means for changing exhaust port timings.

According to the present invention, the above and other objects can be accomplished by two cycle internal combustion engines including cylinder means for defining working chamber means therein, piston means disposed in the cylinder means for slidable movement, exhaust port means formed in the cylinder means so as to open into the working chamber means and adapted to be cylically closed by said piston means during the slidable movement of the piston means, exhaust passage means connected with the exhaust port means, and valve means provided in said exhaust passage means in the vicinity of the exhaust port means for partly closing the exhaust port means in closed position so as to advance exhaust port closing timing and retarded exhaust port opening timing. According to a preferable aspect of the present invention, control means is provided for actuating the valve means to the closed position during low speed operation of the engine. According to the present invention, preferable results can be obtained by actuating the valve means in accordance with the engine throttle valve opening or the engine speed.

According to a preferable mode of the present invention, the exhaust port means comprises an upper port and a lower port, and the valve means includes a rotary valve comprising a valve member in the form of a rotatable rod extending across the exhaust passage means and having diametrically extending valve passage means for co-operation with the upper exhaust port.

The above and other objects and features of the present invention will become apparent from the following descriptions of preferred embodiments taking reference to the accompanying drawings, in which:

FIG. 1 is a diagrammatical sectional view of a two cycle engine in accordance with one embodiment of the present invention;

FIG. 2 is a sectional view taken substantially along the line II—II in FIG. 1;

FIG. 3 is a view as seen substantially along the line III—III in FIG. 1;

FIG. 4 is a diagram showing typical engine output performance curves;

FIG. 5 is a diagram showing an exemplary mode of control of the valve means in accordance with the present invention;

FIG. 6 is a sectional view of an engine cylinder in accordance with another embodiment of the present invention;

FIG. 7 is a sectional view taken substantially along the line VII—VII in FIG. 6;

FIG. 8 is a sectional view but showing a further embodiment of the present invention;

FIG. 9 is a sectional view taken substantially along the line IX—IX in FIG. 8;

Figure 10A:
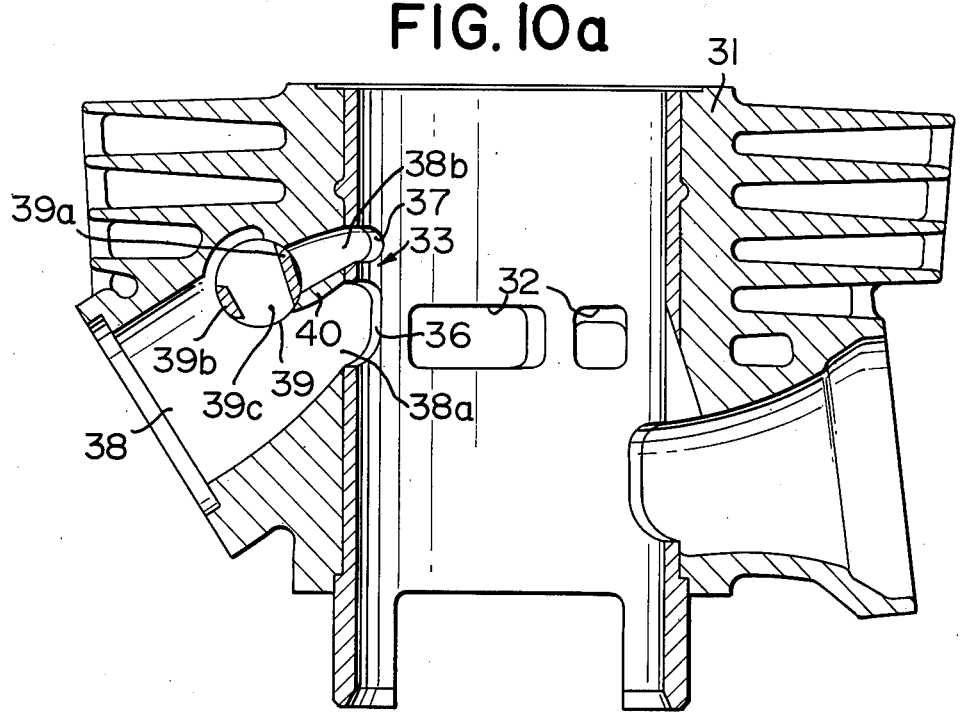
Figure 10B:
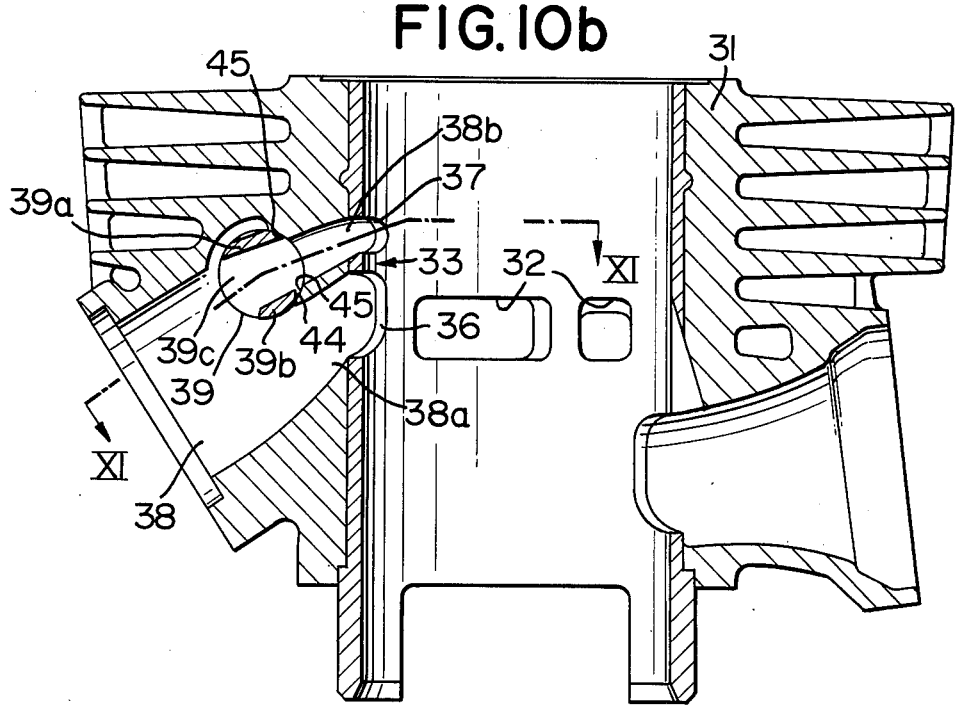

FIGS. 10a and b show sectional view of an engine cylinder in accordance with a further embodiment of the present invention;

FIG. 11 is a sectional view taken substantially along the line XI—XI in FIG. 10b; and FIG. 12 is a sectional view taken along the line XII—XII in FIG. 11.

Referring now to the drawings, particularly to FIGS. 1 through 3, there is shown a two cycle engine including a cylinder 1 provided in the wall surface with scavenging ports 2 and exhaust port means 3. A cylinder head 4 is secured to the upper end of the cylinder 1, and a piston 5 is disposed in the cylinder for sliding movement therein. The exhaust port means 3 comprises, as clearly shown in FIG. 3, a lower port 6 and a pair of upper port 7 disposed above the lower port 6 in side-by-side relationship. The ports 6 and 7 are connected with an exhaust passage 8.

A valve member 9 in the form of a rotatable rod is arranged across the upper ports 7. The valve member 9 is provided with a pair of apertures 9a for co-operation with the ports 7. The valve member 9 is rotatable between an open position in which the apertures 9a communicate the upper exhaust ports 7 as shown in FIGS. 1 and 2 and a closed position in which the apertures 9a are brought out of communication with the upper exhaust ports 7. The valve member 9 has an actuating lever 10 secured thereto so that the valve member 9 is rotated through the lever 10. The lever 10 may for example be interconnected with engine throttle valve (not shown) in such a manner that the upper exhaust ports 7 are opened to the exhaust passage 8 when the engine throttle valve is opened beyond a predetermined value.

When the valve member 9 is in the open position, the upper ports 7 of the exhaust port means 3 come into function so that the opening timing of the exhaust port means 3 is advanced and the closing timing is retarded. Thus, when the valve member 9 is in the open position, the engine output changes in response to the engine speed as shown by the curve A in FIG. 4. In other words, a relatively higher engine output can be obtained under a high engine speed when the valve member 9 is in the open position.

When the valve member 9 is in closed position, only the lower exhaust port 6 of the exhaust port means 3 functions to exhaust the engine combustion gas so that the port opening timing is retarded and the port closing timing is advanced. In this position of the valve member 9, it is therefore possible under low speed engine operation to prevent a substantial amount of unburnt combustible mixture from flowing out of the engine combustion chamber during scavenging and compression stroke of the engine operation. Thus, it is possible to obtain a relatively high engine output under a low speed engine operation and the engine output changes in response to the engine speed as shown in the curve B in FIG. 4.

In FIG. 5, there is shown an example of interconnection between the throttle valve opening and the valve member 9. In this example, the valve member 9 remains in the closed position until the engine throttle valve is opened to "¼" position but it is gradually opened as the throttle valve opening is increased from the "¼" position to "¾" position where the valve member 9 reaches the full open position. By the control of the valve member 9, it is possible to obtain an engine output change as shown by the curve C in FIG. 4. Thus, it should be noted that the illustrated arrangement is effective to obtain a relatively high engine output throughout the engine operating range. It should of course be noted that the manner of control of the valve member 9 is not limited to that shown in FIG. 5 but may be changed as desired.

FIGS. 6 and 7 show an engine cylinder 11 in accordance with another embodiment of the present invention. The cylinder 11 is provided with scavenging ports 12, an exhaust port 13 and an exhaust passage 14 which is connected with the exhaust port 13. The cylinder 11 is further provided with a valve 15 at the upper portion of the exhaust port 13. The valve 15 comprises a pair of spaced disc shaped portions 16 and 17 and a blocking portion 18 extending between the disc shaped portions 16 and 17. The disc shaped portions 16 and 17 are journalled for rotation in the wall portions at the opposite sides of the exhaust passage 14.

As shown in FIG. 6, the blocking portion 18 is substantially of triangular cross-sectional configuration and movable between a projecting position in which it blocks the upper portion of the exhaust port 13 as shown in FIG. 6 and a retracted position in which it is rotated counter-clockwise until it is retracted from the exhaust passage 14. When the blocking portion 18 of the valve member 15 is in the projecting portion as shown in FIG. 6, the opening timing of the exhaust port 13 is retarded and the closing timing is advanced. Thus, it will be noted that the arrangement of FIGS. 6 and 7 can provide similar results as in the arrangement of FIGS. 1 through 3.

In FIGS. 8 and 9, there is shown a further embodiment of the present invention, which includes a slidable valve member in the place of rotatable valve members in the previous embodiments. The embodiment includes a cylinder 21 which is provided with scavenging ports 22, an exhaust port 23 and an exhaust passage 24 connected with the exhaust port 23. The cylinder 21 is further provided with a slidable valve 25 which is located for co-operation with the upper portion of the exhaust port 23.

The valve 25 comprises a slidable member 26 having an end in the form of an annular surface coinciding with the inner wall surface of the cylinder 21. The upper portion of the exhaust port 23 is closed when the slidable member 26 is projected as shown by solid lines in FIG. 8 and opened when it is retracted to the position shown by broken lines.

In FIGS. 10a, 10b, 11 and 12 there is shown an engine cylinder assembly in accordance with a further embodiment of the present invention. Referring specifically to FIGS. 10a and 10b, the cylinder 31 includes scavenging ports 32 and exhaust port means 33 which comprises an upper exhaust port 37 and a lower exhaust port 36. The exhaust ports 36 and 37 are connected with an exhaust passage 38. The exhaust passage 38 is divided at the portion adjacent to the exhaust ports 36 and 37 by a partition 40 into a lower passage portion 38a and an upper passage portion 38b which communicate respectively with the lower and upper exhaust ports 36 and 37.

A rotatable valve member 39 is disposed in the exhaust passage 38 at the downstream end of the upper passage portion 38b. The valve member 39 includes a blocking wall 39a extending transversely of the passage 38, and a stiffening member 39b which is spaced apart from the blocking wall 39a to define a passage 39c therebetween.

As shown in FIG. 11, a pair of similarly constructed cylinders 31a and 31b are located in side-by-side relationship to form the cylinder assembly. In each cylinder, the valve member 39 is rotatably supported at the opposite ends thereof through suitable bearing devices. The valve members 39 for the paired cylinders have adjacent ends which are extended toward each other and connected with a control pulley 41. As shown in FIG. 12, the pulley 41 is connected with one end of a control cable which is in turn connected at the other end with an engine throttle valve control grip 43 of, for example, a motorcycle. Thus, through the actuation of the control grip 43, the valve member 39 is moved through the control cable 42 and the pulley 41, between an open position in which the passage 39c communicates with the passage portion 38b as shown in FIG. 10b and a closed position in which the blocking wall 39a closes the passage portion 38b as shown in FIG. 10a.

In FIGS. 10a and 10b, it will be noted that the embodiment is different from that shown in FIGS. 1 through 3 in that the blocking wall 39a is the only element which has a sufficient dimension for blocking the upper passage portion 38b and the stiffening portion 39b does not have a configuration which can block the passage portion 38b. The upper passage portion 38b terminates at the valve member 39 and is provided with valve seat surfaces 45 for co-operation with the blocking wall 39a. Further, in the open position of the valve member 39 shown in FIG. 10b, it will be noted that the stiffening portion of the valve member 39b is not in close contact with the downstream end of the partition 40 when the valve member 39 is in open position but an appreciable amount of gap 44 is formed therebetween. It will be apparent that, in the arrangement of FIGS. 10 through 12, similar results can be obtained as in the previous embodiments through the control of the valve member 39. The arrangement is advantageous in that the total area of sliding surface can be minimized.

The invention has thus been shown and described with respect to preferred embodiments taking reference to the accompanying drawings, however, it should be noted that the invention is in no way limited to the details of the illustrated structures but changes and modifications may be made without departing from the scope of the appended claims.

We claim:

1. Two cycle internal combustion engines including cylinder means for defining working chamber means therein, piston means disposed in the cylinder means for slidable movement, exhaust port means formed in the cylinder means so as to open into the working chamber means and adapted to be cyclically closed by said piston means during the slidable movement of the piston means, exhaust passage means connected with the exhaust port means, and valve means provided in said exhaust passage means in the vicinity of the exhaust port means, said valve means comprising at least one rotatable member disposed at an upper portion of the exhaust passage means for partly closing the exhaust port means in closed position so as to advance exhaust port closing timing and retard exhaust port opening timing, wherein said exhaust port means comprises at least one upper port and at least one lower port, and the exhaust passage means includes a portion which is located in the vicinity of the exhaust port means and divided into upper and lower passage portions respectively connected with the upper and lower exhaust ports, said valve means being provided in the upper passage portions, further wherein said upper exhaust passage portion terminates at the valve means and the upper and lower exhaust passage portions merge into a single passage immediately behind the valve means, further wherein said upper exhaust passage is provided, at its end adjacent to the valve means, valve seat surface means for cooperating with the valve means, further wherein said valve means is interconnected with engine throttle valve means in such a manner that it is fully closed when the engine throttle valve is in full close position and fully opened when the engine throttle valve is in full open position, and further wherein said valve means comprising at least one rotary member includes a passage defined by a first wall portion and a second wall portion, wherein said first wall portion is dimensioned to block said upper passage portion of said exhaust passage means when said valve means is closed, and said second wall portion is dimensioned to stiffen said valve means without blocking said upper passage portion of said exhaust passage means.

2. Two cycle internal combustion engines including cylinder means for defining working chamber means wherein, piston means disposed in the cylinder means for slidable movement, exhaust port means formed in the cylinder means so as to open into the working chamber means and adapted to be cyclically closed by said piston means during the slidable movement of the piston means, exhaust passage means connected with the exhaust port means, and valve means provided in said exhaust passage means in the vicinity of the exhaust port means, said valve means comprising at least one rotatable member disposed at an upper portion of the exhaust passage means for partly closing the exhaust port means in closed position so as to advance exhaust port closing timing and retard exhaust port opening timing, wherein said exhaust port means comprises at least one upper port and at least one lower port, and the exhaust passage means includes a portion which is located in the vicinity of the exhaust port means and divided into upper and lower passage portions respectively connected with the upper and lower exhaust ports, said valve means being provided in the upper passage portions, further wherein said upper exhaust passage portion terminates at the valve means and the upper and lower exhaust passage portions merge into a single passage immediately behind the valve means and said upper exhaust passage is provided, at its end adjacent to the valve means, valve seat surface means for cooperation with the valve means, further wherein said valve means is interconnected with engine throttle valve in such a manner that it is started to open at a first predetermined opening of the engine throttle valve and gradually opened to a full open position as the engine throttle valve is opened to a second predetermined opening which is less than full throttle valve opening, and further wherein said valve means comprising at least one rotary member includes a passage defined by a first wall portion and a second wall portion, wherein said first wall portion is dimensioned to block said upper passage portion of said exhaust passage means when said valve means is closed, and said second wall portion is dimensioned to stiffen said valve means without blocking said upper wall portion of said exhaust passage means.

* * * * *